(12) United States Patent
Pannell et al.

(10) Patent No.: US 8,437,081 B2
(45) Date of Patent: May 7, 2013

(54) COMPOSITE RECIPROCAL ROTATORS AND THERMALLY COMPENSATED OPTICAL ISOLATORS AND CIRCULATORS THEREFROM

(75) Inventors: Christopher N. Pannell, Orlando, FL (US); Peter MacKay, Somerset (GB)

(73) Assignee: Gooch and Housego PLC, Somerset (GB)

( * ) Notice: Subject to any disclaimer, the term of this patent is extended or adjusted under 35 U.S.C. 154(b) by 535 days.

(21) Appl. No.: 12/691,893

(22) Filed: Jan. 22, 2010

(65) Prior Publication Data
US 2011/0181951 A1 Jul. 28, 2011

(51) Int. Cl.
*G02B 27/28* (2006.01)
(52) U.S. Cl.
USPC ............ 359/484.03; 359/484.05; 359/489.07; 359/489.16
(58) Field of Classification Search .......................... None
See application file for complete search history.

(56) References Cited

U.S. PATENT DOCUMENTS

| | | | |
|---|---|---|---|
| 2004/0001255 A1* | 1/2004 | Fratello | 359/484 |
| 2006/0056029 A1* | 3/2006 | Ye | 359/578 |
| 2006/0291057 A1* | 12/2006 | Fiolka et al. | 359/489 |

* cited by examiner

*Primary Examiner* — Arnel C Lavarias
(74) *Attorney, Agent, or Firm* — Jetter & Associates, P.A.

(57) ABSTRACT

A thermally compensated optical device includes in an optical path an input linear polarizer for transmitting linearly polarized light from a received light beam at a design wavelength. A composite reciprocal rotator includes a first reciprocal material and at least a second reciprocal material provides a reciprocal rotation having a temperature coefficient for reciprocal rotation (tempco$_{rr}$). At least one Faraday rotator provides a non-reciprocal rotation having a temperature coefficient for non-reciprocal rotation (tempco$_{nr}$). An output linear polarizer transmits forward light received after transmission by the Faraday rotator. At a design temperature, the tempco$_{rr}$ and tempco$_{nr}$ have opposite signs and can have magnitudes that match within 50%.

16 Claims, 5 Drawing Sheets

COMPOSITE RECIPROCAL ROTATORS AND THERMALLY COMPENSATED OPTICAL ISOLATORS AND CIRCULATORS THEREFROM

FIELD

Disclosed embodiments relate to optical isolators and circulators.

BACKGROUND

The need for optical isolators in laser systems is well known. The basic purpose of an optical isolator is to only allow the passage of light therethrough in one (forward) direction by efficiently blocking light transmission in the reverse direction. Optical isolators are typically used to prevent unwanted feedback (i.e. backscattered light) into an optical oscillator, such as a laser cavity, where it can cause instability or even failure of the laser.

The quality (i.e.) performance of an optical isolator is typically measured in terms of several parameters, most notably (1) the insertion loss and (2) the isolation ratio. The insertion loss is a measure of the additional loss (i.e. attenuation) imparted to the outgoing laser beam due to the addition of the optical isolator in the beam path. The isolation ratio is the loss (i.e. attenuation) deliberately imparted to returning light trying to get through the isolator the "wrong way". i.e. heading back towards the laser. The isolation ratio is ideally as high (in absolute value) as possible, but in practice varies considerably with values from −25 to −40 dB for operation at around 20° C. commonly encountered in commercially available units.

The isolation performance of conventional optical isolators is generally sensitive to both operating wavelength as well as temperature. Typically the wavelength of an industrial laser is very accurately known and stable, for example for a YAG laser with a nominal wavelength of 1064 nm, so that wavelength variation is generally not a significant problem. The effect of temperature on optical isolation, however, is generally far more serious.

A conventional optical isolator is a two port device that comprises in an optical path an input polarizer, a 45° Faraday rotator and a 45° output polarizer. In operation, linearly polarized light from a light source such as a laser (e.g. vertically polarized light) passes straight through the input polarizer, gets rotated +45° by the Faraday rotator, then passes straight through the 45°-orientated output polarizer (also referred to as an analyzer) with (ideally) no insertion loss. If a mirror is placed after the output polarizer, light will be reflected back and pass through the output polarizer in the opposite direction (i.e. the reverse direction), will then get rotated by another 45° by the Faraday rotator, so it becomes horizontally polarized when it encounters the input polarizer. Thus, the returning horizontally polarized light is blocked from reaching the light source (e.g. laser) by the input polarizer.

However, if the returning light is partially depolarized by the mirror, the returning light is still largely blocked, however, some of the returning light is blocked at the output polarizer and the remainder is blocked at the input polarizer. The key to this process is the Faraday rotator, also called a non-reciprocal rotator, which has the property of rotating the polarization of incident light in the same direction irrespective of the direction of light propagation. Such a device is well-known and is typically constructed by using a Terbium-doped glass rod or a terbium gallium garnet (TGG) crystal (in the form of a rod) placed in an axial magnetic field. The axial magnetic field is conventionally achieved using a magnet in the form of a tube, with the direction of magnetization along the axis of the tube, with the TGG rod placed in the central hole. The magnitude of the polarization rotation provided by the Faraday rotator varies with temperature, which generally decreases in magnitude with increasing temperature.

For example, a Faraday rotator designed to operate at 20° C. to produce a 45° rotation will typically produce progressively less rotation as the temperature is increased above 20° C. The effect of variation of temperature on optical isolation can be a very serious problem so that, the isolation in a physically realizable device may in practice be −70 dB at a design temperature, of 20° C., falling to only about −23 dB at both 0° C. and 40° C.

SUMMARY

This Summary is provided to comply with 37 C.F.R. §1.73, presenting a summary of the disclosed embodiments to briefly indicate the nature and substance of this Disclosure. It is submitted with the understanding that it will not be used to interpret or limit the scope or meaning of the claims.

Disclosed embodiments include non-reciprocal optical devices that provide passive thermally compensated isolation performance which can be embodied as optical isolators (2 port embodiments) or optical circulators (3 or more port embodiments). The addition of a composite reciprocal rotator including a first material and at least a second different material in the optical path of optical isolators and circulators having respective proper thicknesses that can be calculated as described below, has been found by the Inventors to trade off a small amount of insertion loss to gain a significant improvement in isolation ratio (e.g. 30 dB) over a range of temperatures on either side of the design temperature, as demonstrated in the Examples section below.

The thermally compensated optical device includes in an optical path an input linear polarizer for transmitting linearly polarized light from a received light beam at a design wavelength. A composite reciprocal rotator comprising, a first reciprocal material and at least a second reciprocal material provides a reciprocal rotation having a temperature coefficient for reciprocal rotation (tempco$_{rr}$). At least one Faraday rotator provides a non-reciprocal rotation having a temperature coefficient for non-reciprocal rotation (tempco$_{nr}$). An output linear polarizer transmits forward light received after transmission by the Faraday rotator. At a design temperature, the tempco$_{rr}$ has an opposite sign and in some embodiments has a magnitude that matches within 50% relative to a magnitude of tempco$_{nr}$. Such thermal compensation reduces a temperature variation of the total forward rotation provided by the optical device so that rejection of backscattered light by the optical device is increased over a range of temperatures around the design temperature.

DETAILED DESCRIPTION

Figure 1A:
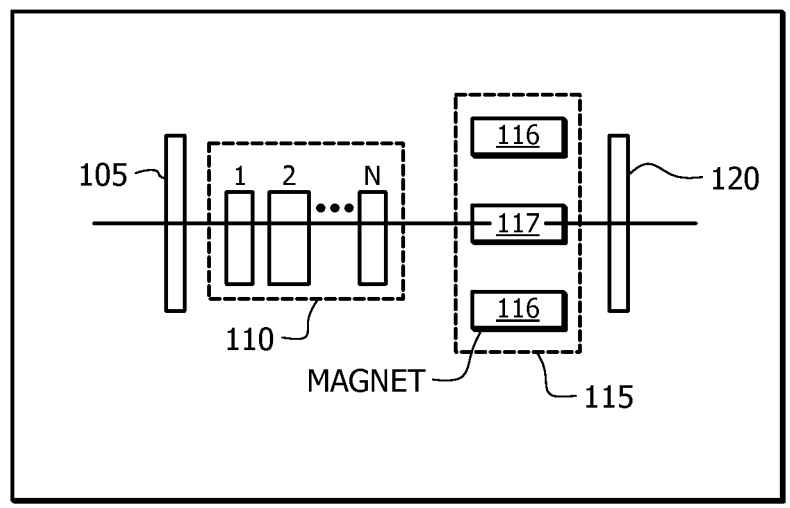
FIG. 1A is a block diagram schematic of a thermally compensated non-reciprocal optical device, according to a disclosed embodiment.

Disclosed embodiments are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the disclosed embodiments can be practiced without one or more of the specific details or with other methods. In other instances, well-known structures or operations are not shown in detail to avoid obscuring the disclosed embodiments. The disclosed embodiments are not limited by the illustrated ordering of acts or events, as some acts may occur in different orders and/or concurrently with other acts or events. Furthermore, not all illustrated acts or events are required to implement a methodology in accordance with disclosed embodiments.

FIG. 1A is a block diagram schematic of a thermally compensated non-reciprocal optical device 100, according to a disclosed embodiment. Optical device 100 includes in an optical path an input linear polarizer 105, a composite temperature compensating reciprocal rotator 110, a Faraday rotator 115 and an output linear polarizer 120. As known in the art, the Faraday rotator 115 comprises an outer magnet 116 that surrounds and provides an axial magnetic field for a transmissive material 117 in the optical path that is generally formed as a rod (e.g. a TGG rod).

The composite reciprocal rotator 110 is shown comprising a plurality of slabs (1, 2 . . . N) of reciprocal material. Although the plurality of slabs are shown in sequence with one another, such as secured (e.g. by an adhesive) to one another, the reciprocal rotator can be embodied as a split design, such as one or more slabs on both sides of the Faraday rotator 115. Moreover, there is generally no restriction on the order of the slabs, or the order of the Faraday rotator 115 and the reciprocal rotator 110, or portions thereof. The plurality of slabs include at least two different materials to satisfy the following two simultaneous conditions described below that were recognized by the Inventors for realizing temperature compensated isolator (or circulator) performance:

i. Tempco compensation tier total amount of rotation: At the design temperature (e.g. 20° C.), the tempco$_{rr}$ (e.g. degrees, of reciprocal rotation/degree of temperature change) provided by composite reciprocal rotator 110 has an opposite sign and can have a magnitude that is within 50% relative to the tempco$_{nr}$ provided by the Faraday rotator 115 (e.g. degrees of non-reciprocal rotation/degree of temperature change). As a result of tempco compensation/cancellation provided by addition of composite reciprocal rotator 110, the overall tempco of rotation for the non-reciprocal optical device 100 is reduced as compared to the tempco of rotation for conventional optical isolators or circulators that are determined almost entirely by tempco$_{nr}$.

The magnitude matching of the tempcos for rotation are typically within 20%, and can be within 10%. For a nominal design temperature of 20° C., the full design temperature range may be 0° C. to 40° C., as demonstrated in the Examples below, with the degree of isolation for the non-reciprocal optical device 100 generally remaining above 30 dB between the full temperature range of 0° C. and 40° C.

ii. No significant net rotation added by the addition of the composite reciprocal rotator 110 to the isolator or circulator: The value (magnitude) of the reciprocal rotation provided by the composite reciprocal rotator 110 at the design temperature is substantially equal to 2 nπ radians, where n is 0 or any positive or negative integer, such as proving a reciprocal rotation of 0 radians, 2π radians or 4π radians (thus providing no net rotation). "Substantially equal to" as used above relating to the value of reciprocal rotation provided is defined herein to be within 3 degrees, or in another embodiment within 2 degrees of no net rotation. The no significant net rotation added condition provided by the reciprocal rotator 110 at the design temperature (as opposed to a net rotation outside this range) is provided so that the polarization state of the returning (backscattered) light is substantially orthogonal to that of the outgoing (forward) light, so it is efficiently blocked, allowing the isolator or circulator to include a composite reciprocal rotator disclosed herein and still provide a high isolation ratio.

Since it is generally not possible to find a single optical material satisfying conditions i and ii shown above simultaneously, composite reciprocal rotators 110 disclosed herein comprise two (or more) different materials that allow a weighted sum to be created by using two different path lengths in the optical path. In the case of two (2) slabs, one path length is for slab 1 comprising reciprocal material #1 and another path length is for slab 2 comprising reciprocal material #2 which is a different material that has different rotational parameters as compared to reciprocal material #1.

Regarding the operation of optical device 100, if the composite temperature compensated reciprocal rotator 110 is designed to rotate light by X degrees, and the non-reciprocal Faraday rotator 115 is designed to rotate light by 45 degrees, with the output polarizer 120 set to 45 degrees÷X with respect to the input polarizer 105, there will be essentially no insertion loss. If the reciprocal rotator 110 had no temperature variation, the addition of a compensating (reciprocal) rotator 110 in such an arrangement would have no effect. If some insertion loss on the way out (forward direction) is not considered a problem, the output polarizer 120 could be set as desired so that the returning (reflected) light picks up the necessary total 45 degrees of rotation on the way back for a wide range of temperatures, so that in one specific example at some elevated temperature (e.g. 35° C.) 40 degrees of rotation is provided by the Faraday rotator 115, with the extra (compensating) 5 degrees of rotation coming from the compensating rotator 110 to maintain good isolation.

The outgoing light will be linearly polarized at (say) −45 because that is the direction of the output polarizer 120, but a small portion of the outgoing light will not get through it. As a result. The Inventors have recognized that by adding a small insertion loss (e.g. a fraction of a dB) provides a substantial improvement in isolation because only a small amount of light leakage is needed to significantly reduce the isolation ratio on the reverse path, since the starting point is ideally nothing, but if on the way out (forward direction) the loss is the same small amount, the insertion loss due to addition of the reciprocal rotator 110 is calculated using the high-forward power as the baseline.

Figure 1B:
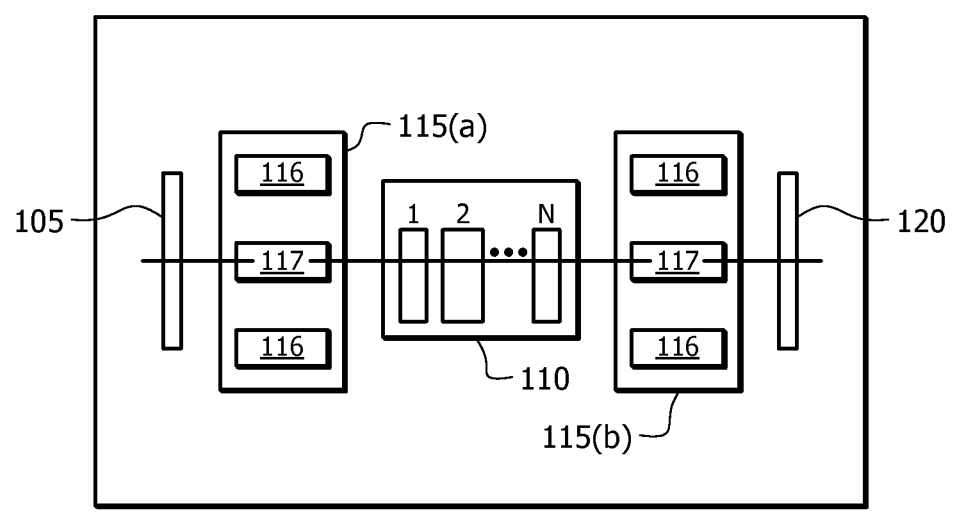
FIG. 1B is a block diagram schematic of a thermally compensated non-reciprocal optical device having a split Faraday rotator, according to a disclosed embodiment.

FIG. 1B is a block diagram schematic of a thermally compensated non-reciprocal optical device 150 having a split Faraday rotator shown as Faraday elements 115(a) and 115(b), according to a disclosed embodiment. In one embodiment Faraday elements 115(a) and 115(b) each provide 22.5 degrees of rotation. However, the rotation split need not be equal, and more than two Faraday elements may be included. Splitting the Faraday element into multiple sections can be used for various purposes, including achieving some additional form of compensation besides temperature compensated isolation performance, such as for compensating for power-dependent effects that can lead to a loss of isolation. Although not shown, as described above, analogous to the split Faraday rotator 115(a) and 115(b) shown in FIG. 1B, the composite reciprocal rotator 110 can be split, so that the respective slabs of different optical material are spaced apart.

Figure 2:
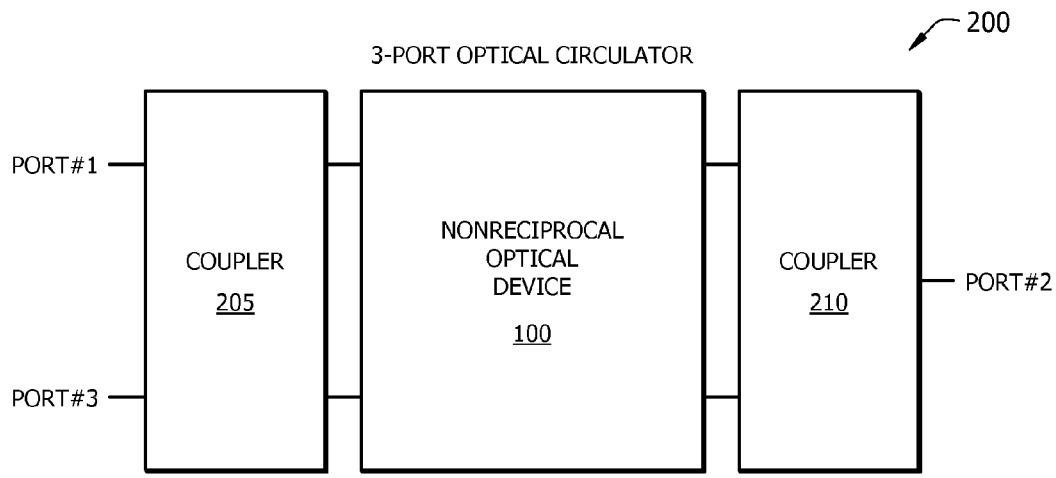
FIG. 2 is a schematic block diagram of an exemplary 3-port optical circulator including a thermally compensated non-reciprocal optical device according to a disclosed embodiment.

FIG. 2 shows a block diagram schematic an exemplary 3-port optical circulator 200 including a thermally compensated non-reciprocal optical device 100 according to a disclosed embodiment. Circulator 200 includes Port#1 and Port#3 shown coupled to input optical coupler 205, and Port#2 coupled to an output of output optical coupler 210. Like thermally compensated non-reciprocal optical devices 100 and 150 described above which when embodied as 2 port devices are optical isolators, optical circulator 200 is a 3 or more port device designed to allow light to travel in only one direction (i.e. the forward direction). Circulator 200 can also be used to achieve bi-directional transmission over a single fiber. Because of its high isolation of the input and reflected optical powers and its low insertion loss, optical circulators are widely used in advanced communication systems and fiber-optic sensor applications.

A method of calculating design parameters for a composite reciprocal rotator for placement in a beam path to maintain isolation performance or an optical isolator or circulator over temperature variation, and optionally also over wavelength variation is now described. For a non-reciprocal optical device including both a reciprocal rotator and non-reciprocal rotator such as shown in FIG. 1A or 1B, the transmitted (T) optical power in the forward (Tout) and reverse (Trev) directions is given by $$T_{out}=\cos^2(\Delta_{NR}+\theta_R)$$

$$T_{rev}=\sin^2(\Delta_{NR}-\theta_R) \quad (1)$$

where we have put $$\theta_{NP}=\pi/4+\Delta_{NR} \quad (2)$$

At the operating wavelength (e.g. 1.064 μm) and design temperature (e.g. 20° C.) $\Delta_{NR}$ would be zero, and $\theta_R$ would be an integer multiple of $2\pi$ (i.e. $2n\pi$, where n is an integer including possibly zero). We can now put $$\Delta_{NR}=\hat{\Delta}_{NR}L_{iso} \quad (3)$$

where $L_{iso}$ is the length of the isolator's Faraday (non-reciprocal) rotator 115, arbitrarily set at 25 mm in the Examples described herein, and $\hat{\Delta}$ is the specific (non-reciprocal) rotation provided by the Faraday rotator 115 in radians per mm.

In general, $\hat{\Delta}$ will be a function of both temperature and wavelength, so the Function in (3) can be expanded as a Taylor series about the design temperature T (20° C. in the Examples provided herein) and the design wavelength (1.064 μm in the Examples provided herein) as follows up to the $2^{nd}$ order terms:

$$\hat{\Delta}_{NR}=\alpha_1 T+\alpha_2 T^2+\beta_1\Lambda+\beta_2\Lambda^2+\gamma\Lambda T+ \quad (4)$$

where $\alpha,\beta,\gamma$ etc are material constants. $T=(T_{op}-20)$ is the temperature deviation from the design temperature of 20° C. and $\Lambda=(\lambda-1.064)$ is the deviation from the design wavelength from 1.064 microns.

Reciprocal Rotations:

The composite reciprocal rotator 110 includes a sequence of N materials (e.g. slabs), each of length $L_i$, i=1 . . . N. The total reciprocal rotation provided by the composite reciprocal rotator 110 can be written as $$\theta_R = \hat{\theta}_R^{(1)} L_1 + \ldots + \hat{\theta}_R^{(N)} L_N \quad (5)$$

where (up to $2^{nd}$ order terms)

$$\hat{\theta}_R^{(i)}=K_i+p_i T+q_i T^2+r_i\Lambda+s_i\Lambda^2+t_i T\Lambda+ \quad (6)$$

Thus the total reciprocal rotation provided by composite reciprocal rotator 110 is:

$$\theta_R=K+pT+qT^2+r\Lambda+s\Lambda^2+tT\Lambda+ \quad (7)$$

where $$K = \sum_{i=1}^{N} K_i L_i \quad (8)$$

$$p = \sum_{i=1}^{N} p_i L_i$$

$$q = \sum_{i=1}^{N} q_i L_i$$

etc.

Written out, the expression for $T_{rev}$ is:

$$T_{rev}=\sin^2[(\alpha_1 T+\alpha_2 T^2+\beta_1\Lambda+\beta_2\Lambda^2+\ldots)L_{iso}-(K+pT+qT^2+r\Lambda+s\Lambda^2+\ldots)] \quad (9)$$

It can be seen from (9) that the temperature (T) and wavelength $\Lambda$ dependence can be cancelled up to a given order M in the Taylor expansion by equating powers of T, $\Lambda$, $T^2$, $\Lambda^2$ up to and including terms of the $M^{th}$ order.

If isolation compensation is desired over wavelength (as well as for over temperature), a minimum of 3 different materials are need for the composite non-reciprocal rotator 110, because there is now 3 separate/independent conditions/equations to simultaneously satisfy. The new condition to provide wavelength compensation is that the composite reciprocal rotator 110 provides a magnitude matched and opposite sign variation of rotation with a change in wavelength as compared to the Faraday rotator 115. See Example 2 below.

Embodiments of the invention are of particular utility for typical optical isolator and circulator applications which can benefit from passive thermal compensation, thus providing thermal compensation without requiring the supply of electrical power. For example, certain applications do not have the option of incorporating active thermal control (e.g. by electrically heating the isolator to a temperature well above the ambient temperature and maintaining the temperature thermostatically).

Embodiments of the invention also include composite reciprocal rotators having a specified amount of rotation in which the specified amount of rotation is insensitive to temperature changes (i.e. a zero or near zero temperature coefficient; an "athermal" reciprocal rotator). For example, by proper selection of the respective materials and their path lengths as described herein, a desired amount of reciprocal rotation can be provided, and the temperature coefficient for reciprocal rotation for the respective materials can be of opposite sign and matching in magnitude so the composite reciprocal rotator has a temperature coefficient for reciprocal rotation (tempco$_{rr}$) that is very small.

An athermal composite reciprocal rotator would generally not be useful as an embodiment tier the compensated isolators or circulators disclosed herein, since the thermal sensitivity of the composite reciprocal rotator as described above is designed to cancel out the thermal sensitivity of the non-reciprocal (Faraday) rotator, which is typically far from being zero. However, athermal composite reciprocal rotators may be useful in some other applications that can benefit from a reciprocal rotator having a zero or near zero temperature coefficient.

EXAMPLES

Embodiments of the invention are further illustrated by the following specific Examples, which should not be construed as limiting the scope or content of embodiments of the invention in any way.

Example 1

Providing Thermal Compensation for Isolation Performance, Up to the Linear Term

In this Example, the wavelength is restricted to the design wavelength so $\Lambda=0$ (no deviation in operating wavelength). Moreover, in this Example, the composite reciprocal rotator comprise 2 slabs, slab 1 of the reciprocal rotator 110 comprising material (1) selected to be RH (right handed) quartz, and slab 2 comprising material (2) selected to be RH—TeO$_2$.

The two unknowns to be found are the optical path lengths of the first and second slabs. $L_1$ and $L_2$, respectively, which can be found using the two equations provided below:

$$\alpha_1 L_{iso} = p$$

$$K = 2n\pi \quad (10)$$

Only two materials are needed since there are only two equations to be solved, with the following resulting two equations.

$$p = p_1 L_1 + p_2 L_2 \quad (11)$$

$$K = K_1 L_1 + K_2 L_2 \quad (12)$$

Writing (11,12) in matrix form.

$$\begin{pmatrix} K_1 & K_2 \\ p_1 & p_2 \end{pmatrix} \begin{pmatrix} L_1 \\ L_2 \end{pmatrix} = \begin{pmatrix} 2n\pi \\ \alpha_1 L_{iso} \end{pmatrix} \quad (13)$$

From published data for material 1 and material 2,
$K_1$=6.3133 deg/mm, $K_2$=25.474 deg/mm
$p_1$=8.84×10$^{-4}$ deg/mm/K, $p_2$=−1.115×10$^{-3}$ deg/mm/K
Here, things are arranged so $L_{iso}$=25 mm, and $\alpha_1$=−8.4×10$^{-3}$ deg/mm/K.

Figure 3:
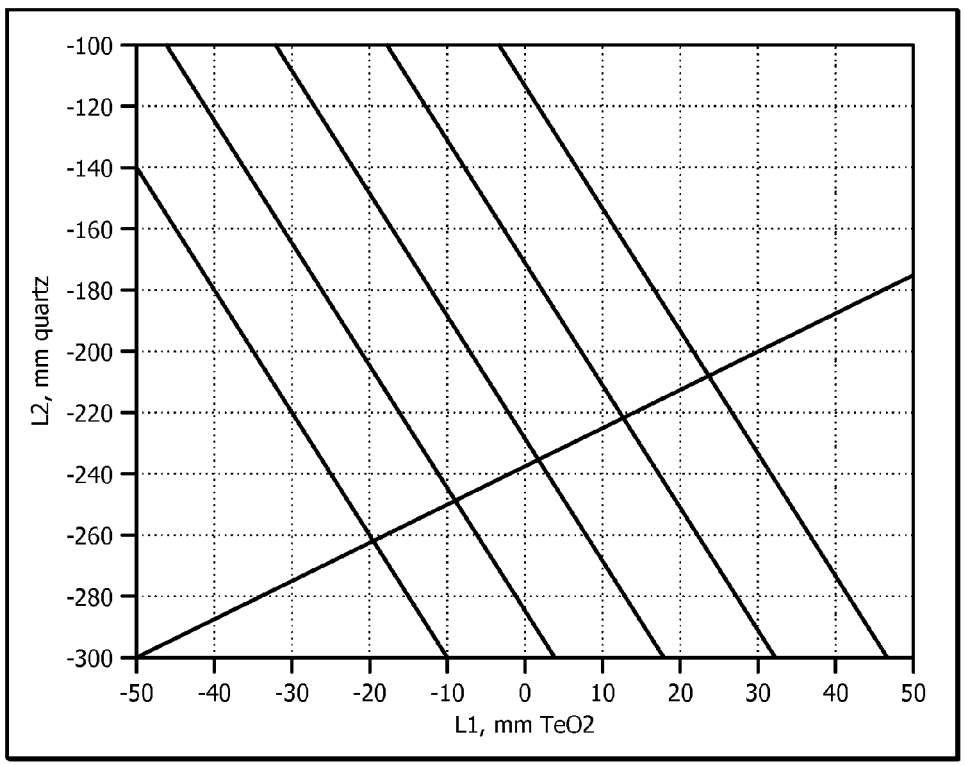
FIG. 3 shows solutions to equation 13 described below which when solved provide lengths for the respective materials for a composite reciprocal rotator according to a disclosed embodiment, for different values of n ranging from n=−6 to −2.

FIG. 3 shows solutions to equation 13 described below to provide lengths for the respective materials for composite reciprocal rotator 110, for different values of n ranging from n=−6 to −2. The intersection points shown provide the solutions to equation 13 and it is clear that there are an infinite number of possible solutions. The solutions that use least material (thinnest) are therefore of most interest due primarily to cost considerations, and since TeO$_2$ is more absorbing and more expensive than quartz, in one exemplary embodiment the solution corresponding to n=−3 or n=−4 is selected, which corresponds to relatively short lengths of TeO$_2$ ($L_1$) of ~4 or ~15 mm respectively. Note that $L_2$ is negative, for these solutions, which means that left-handed quartz, where it was assumed right-handed material is associated with positive lengths (i.e. $L_1$>0 and $L_2$>0).

Figure 4:
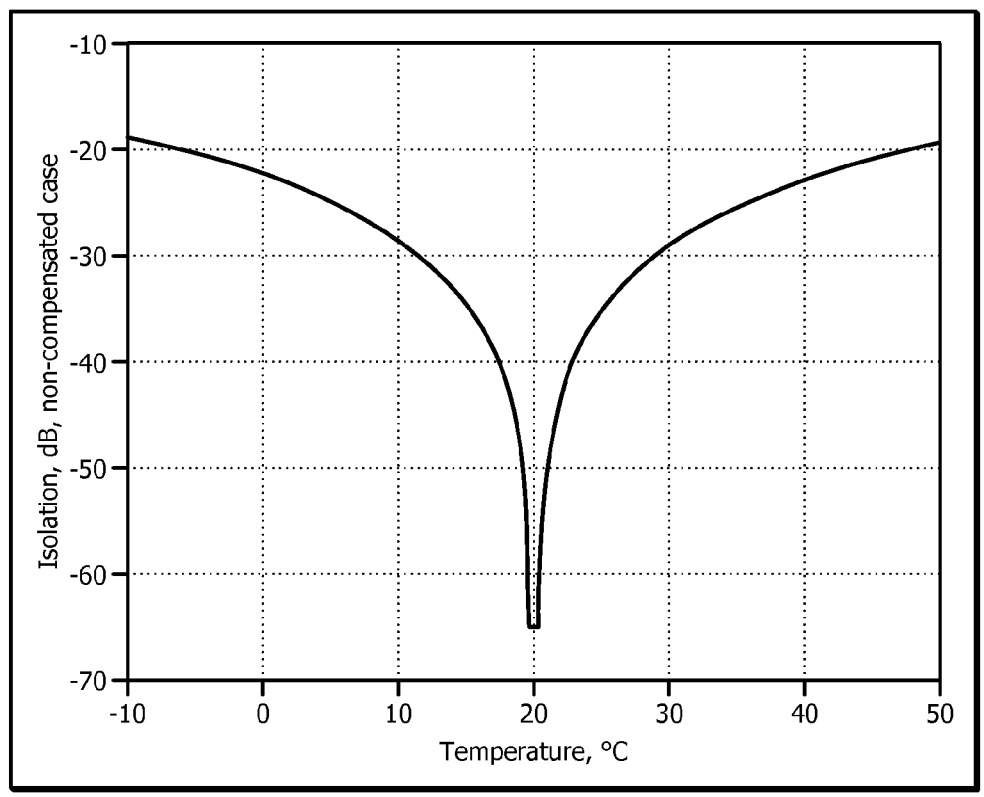
FIGS. 4 and 5 show uncompensated isolator performance vs. temperature and compensated isolator performance vs. temperature according to a disclosed embodiment, respectively.
Figure 5:
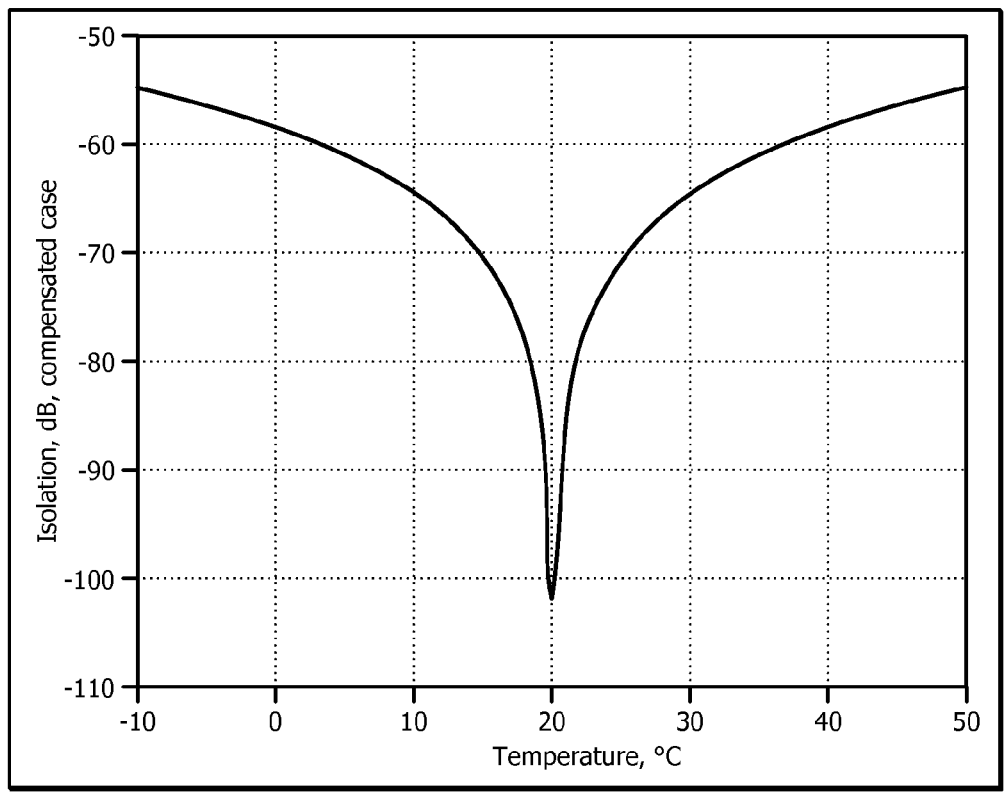

FIGS. 4 and 5 show uncompensated isolator performance vs. temperature and compensated isolator performance vs. temperature according to the disclosed embodiment described above, respectively. The isolation ratio in the uncompensated case (FIG. 4) is ~−18 dB at −10° C., which is seen to improve to ~−55 dB with compensation described above, an improvement in isolation at −10° C. of about 37 dB.

Figure 6:
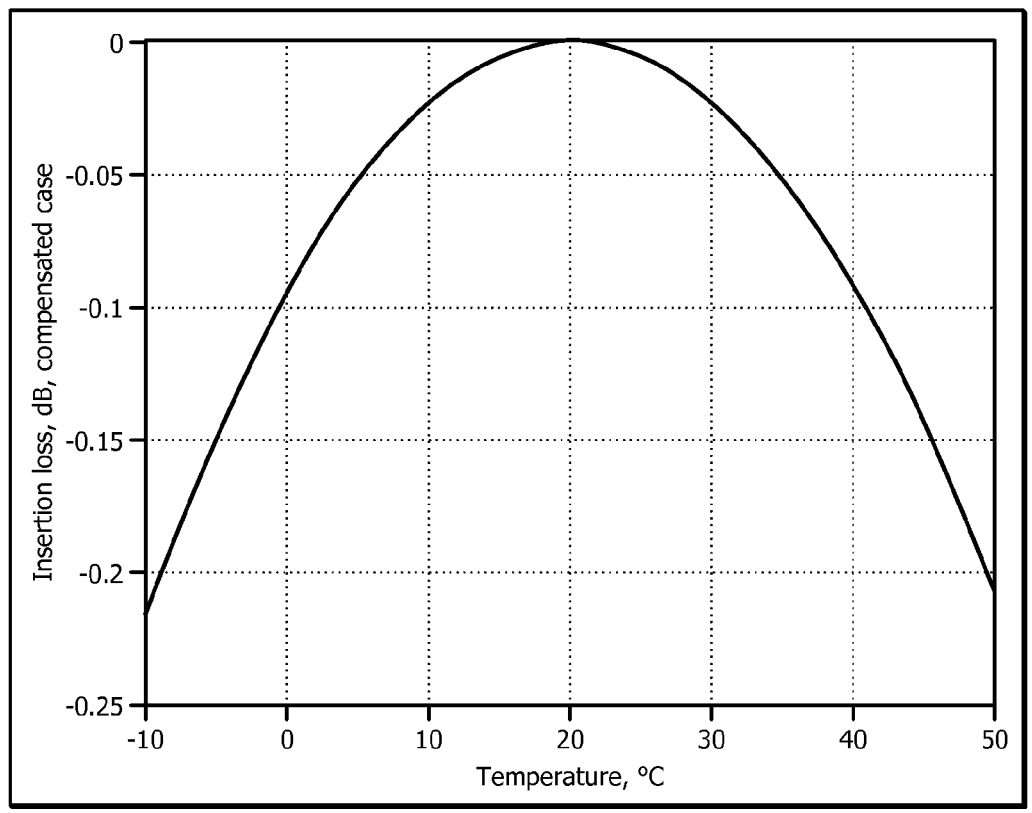
FIG. 6 shows insertion loss variation with temperature for the compensate isolator calculated using equation 1 describe below, according to a disclosed embodiment.

The effect of adding a composite reciprocal rotator as disclosed herein to the optical path of an isolator or circulator is now considered with regard to insertion loss and wavelength sensitivity. In the case of insertion loss, as described above, temperature compensation for isolation can be traded off for some minimal insertion loss. The insertion loss variation with temperature for the compensated isolator can be calculated using equation (1) which is illustrated in FIG. 6. The peak insertion loss over the range from −10° C. to 50° C. is only ~0.225 dB, which is low because crystal absorption, AR coatings, etc. and will add up to a total already greater than this in a real isolator or circulator device. In a fiber system, insertion loss in the fiber→free space beam→fiber coupling scheme will generally be appreciable too.

Figure 7:
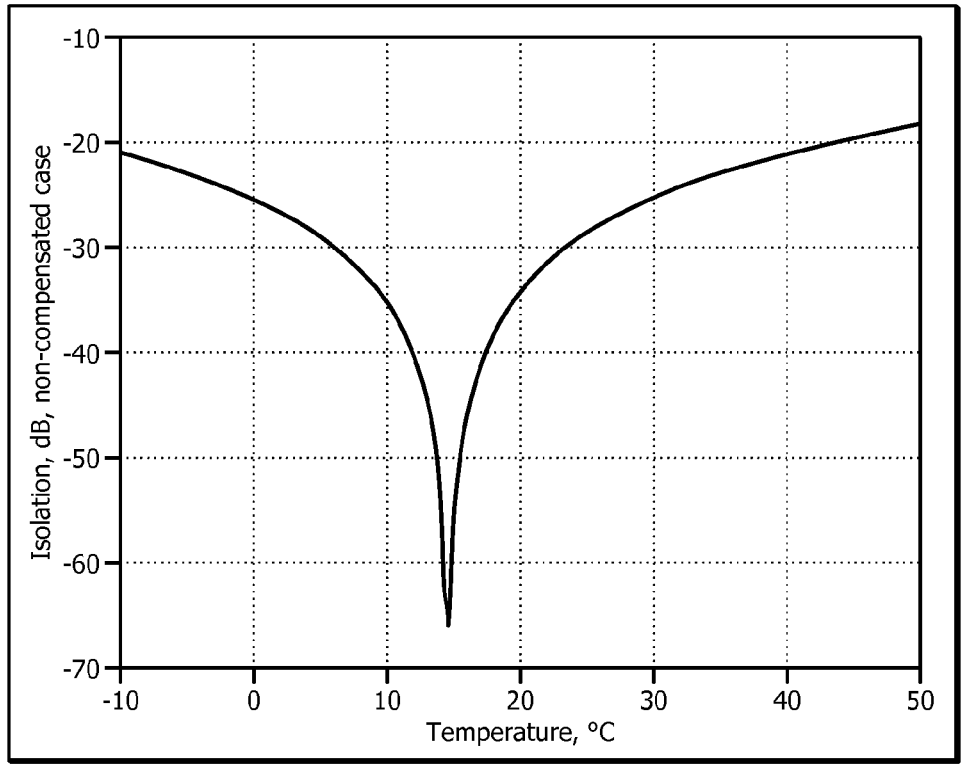
FIGS. 7 and 8 show the effect on isolation performance over temperature due to an increase in the operating wavelength from the design wavelength by 5 nm (wavelength of 1.069 μm) for an uncompensated isolator and a compensated isolator according to a disclosed embodiment, respectively.
Figure 8:
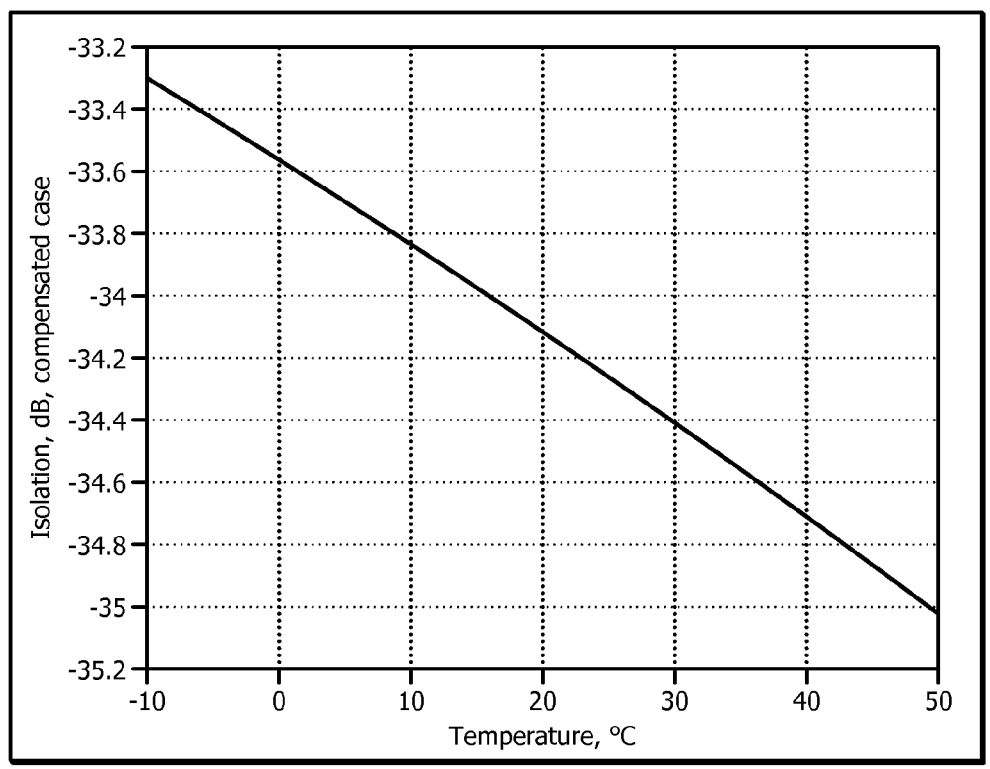

FIGS. 7 and 8 show the effect on isolation performance over temperature due to an increase in the operating wavelength from the design wavelength by 5 nm (wavelength of 1.069 μm) for an uncompensated isolator and a compensated isolator according to a disclosed embodiment, respectively. It can be seen that the isolation with the compensated isolator (FIG. 8) provides a fairly constant isolation that is better than −33.3 dB over the temperature range from −10° C. to 50° C.

Figure 9:
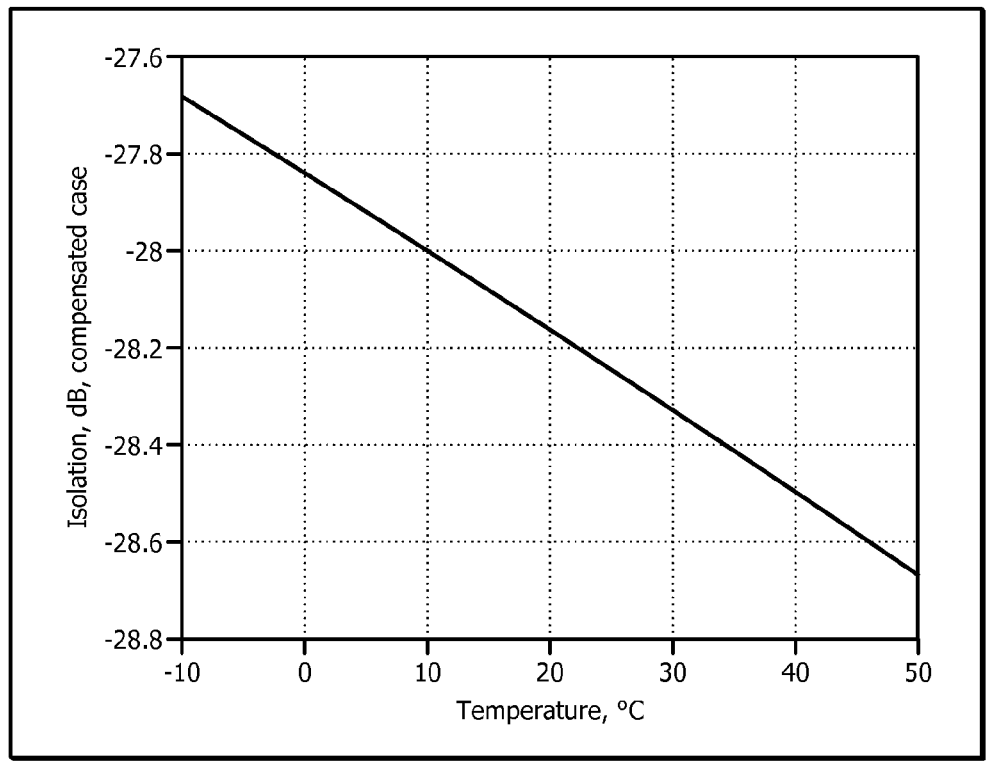
FIG. 9 shows the isolation performance with temperature for a compensated isolator according to a disclosed embodiment operating 10 nm away from the design wavelength.

FIG. 9 shows the isolation performance with temperature for a compensated isolator according to a disclosed embodiment operating 10 nm away from the design wavelength. The isolation is seen to be better than 27.7 dB over the temperature range shown.

Example 2

Thermal and Wavelength Compensation for Isolation Performance, Up to the Linear Term In Example 1, to find design parameters for a composite reciprocal rotator for thermally compensating an optical isolator or circulator, the lengths $L_1$ and $L_2$ for materials 1 and 2 were found using the following two equations:

$$\alpha_1 L_{iso} = p$$

$$K = 2n\pi \quad (14)$$

To add wavelength compensation make the device substantially achromatic, a minimum of three materials are needed since there are now three equations to solve. Then $$p = p_1 L_1 - p_2 L_2 + p_3 L_3 \quad (15)$$

$$r = r_1 L_1 + r_2 L_2 + r_3 L_3 \quad (16)$$

$$K = K_1 L_1 + K_2 L_2 + K_3 L_3 \quad (17)$$

The $3^{rd}$ material in this example is chosen to be potassium chlorate, which has the following relevant optical parameters at 1.064 μM and 20° C.:

$$p_3 = 5.41 \times 10^{-4} \text{ deg/mm/K}$$

$$K_3 = 1.11 \text{ deg/mm}$$

$$r_3 = -2.34 \text{ deg/mm/μm}$$

In addition, the wavelength sensitivities for the two original materials, are now needed for this calculation, (1) quartz and (2) TeO$_2$, which are as follows:

$$r_1 = -12.2 \text{ deg/mm/μm}$$

$$r_2 = -51.6 \text{ deg/mm/μm}$$

Writing (15,16,17) in matrix form.

$$\begin{pmatrix} K_1 & K_2 & K_3 \\ p_1 & p_2 & p_3 \\ r_1 & r_2 & r_3 \end{pmatrix} \begin{pmatrix} L_1 \\ L_2 \\ L_3 \end{pmatrix} = \begin{pmatrix} 2n\pi \\ \alpha_1 L_{iso} \\ \beta_1 L_{iso} \end{pmatrix} \quad (18)$$

Fixing $L_{iso} = 25$ mm, $\alpha_1 8.4 \times 10^{-3}$ deg/mm/K, and β1 allows L1, L2 and L3 to be solved for.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. Thus, the breadth and scope of embodiments of the invention should not be limited by any of the above explicitly described embodiments. Rather, the scope of the invention should be defined in accordance with the following claims and their equivalents.

Although the embodiments of invention have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of this Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. A thermally compensated non-reciprocal optical device, comprising in an optical path:
    an input linear polarizer for transmitting linearly polarized light from a received light beam at a design wavelength;
    a composite reciprocal rotator comprising a first slab including a first reciprocal material and at least a second slab including a second reciprocal material different from said first reciprocal material, wherein a temperature coefficient of reciprocal rotation for said first slab and said second slab are both at least $|5 \times 10^{-4}|$ degree/mm/K, said composite reciprocal rotator providing a composite reciprocal rotation and a composite temperature coefficient for said reciprocal rotation:
    at least one Faraday rotator for providing a non-reciprocal rotation having a temperature coefficient for said non-reciprocal rotation, and
    an output linear polarizer for transmitting forward light after transmission by said Faraday rotator;
    wherein at a design temperature said temperature coefficient for said composite reciprocal rotation has an opposite sign and a magnitude that matches within 50% relative to a magnitude of said temperature coefficient for said non-reciprocal rotation for reducing a temperature variation of a total forward rotation provided by said optical device so that rejection of backscattered light by said optical device is improved as a temperature is varied from said design temperature.

2. The optical device of claim 1, wherein said magnitude of said composite temperature coefficient for said reciprocal rotation is within 20% of said magnitude of said temperature coefficient for said non-reciprocal rotation at said design temperature.

3. The optical device of claim 1, wherein a value of said composite reciprocal rotation provided at said design temperature is substantially equal to 2 nπ degrees, where n=0 or any positive or negative integer.

4. The optical device of claim 1, wherein said composite reciprocal rotator further comprises a third reciprocal material different from both said first and said second reciprocal material, said third reciprocal material selected to render said rejection of backscattered light by said optical device substantially insensitive to changes in wavelength around said design wavelength.

5. The optical device of claim 1, wherein a path length for said first reciprocal material is different as compared to a path length for said second reciprocal material.

6. The optical device of claim 1, wherein said at least one Faraday rotator comprises at least a first and a second Faraday rotator.

7. The optical device of claim 1, wherein said optical device comprises an optical isolator.

8. The optical device of claim 1, wherein said optical device comprises an optical circulator.

9. A thermally compensated non-reciprocal optical device, comprising in an optical path:
   an input linear polarizer for transmitting linearly polarized light from a received light beam at a design wavelength;
   a composite reciprocal rotator comprising a first slab including a first reciprocal material and at least a second slab including a second reciprocal material different from said first reciprocal material, wherein a temperature coefficient of reciprocal rotation for said first slab and said second slab are both at least $|5\times10^{-4}|$ degree/mm/K, said composite reciprocal rotator providing a composite reciprocal rotation and a composite temperature coefficient for said reciprocal rotation:
   at least one Faraday rotator for providing a non-reciprocal rotation having a temperature coefficient for said non-reciprocal rotation; and
   an output linear polarizer for transmitting forward light after transmission by said Faraday rotator;
   wherein at a design temperature said composite temperature coefficient for said reciprocal rotation and said temperature coefficient for said non-reciprocal rotation have opposite signs for reducing a temperature variation of a total forward rotation provided by said optical device so that rejection of backscattered light by said optical device is improved as a temperature is varied from said design temperature.

10. The optical device of claim 9, wherein at said design temperature said composite temperature coefficient for said reciprocal rotation has an opposite sign and a magnitude that matches within 50% relative to a magnitude of said temperature coefficient for said non-reciprocal rotation.

11. The optical device of claim 9, wherein a value of said reciprocal rotation provided at said design temperature is substantially equal to 2 nπ degrees, where n=0 or any positive or negative integer.

12. The optical device of claim 9, wherein said composite reciprocal rotator further comprises a third reciprocal material different from both said first and said second reciprocal material, said third reciprocal material selected to render said rejection of said backscattered light by said optical device substantially insensitive to changes in wavelength around said design wavelength.

13. A method of forming a thermally compensated non-reciprocal optical device comprising a non-reciprocal rotator that provides a non-reciprocal rotation having temperature coefficient for said non-reciprocal rotation, comprising:
   positioning a composite reciprocal rotator within an optical path of said non-reciprocal optical device, said composite reciprocal rotator comprising a first slab including a first reciprocal material and at least a second slab including a second reciprocal material different from said first reciprocal material, wherein a temperature coefficient of reciprocal rotation for said first slab and said second slab are both at least $|5\times10^{-4}|$ degree/mm/K, said composite reciprocal rotator providing a composite reciprocal rotation and a composite temperature coefficient for said reciprocal rotation,
   wherein at a design temperature said temperature coefficient for said composite reciprocal rotation and said temperature coefficient for said non-reciprocal rotation have opposite signs for reducing a temperature variation of a total forward rotation provided by said optical device so that rejection of backscattered light by said optical device is improved as a temperature is varied from said design temperature.

14. The method of claim 13, further comprising calculating design parameters for said composite reciprocal rotator including:
   providing a first equation which is a function of temperature (T) and wavelength (Λ) that relates a total reciprocal rotation for said composite reciprocal rotator including a first term representing said first reciprocal material and a first optical path length for said first reciprocal material and a second term representing said second reciprocal material and a second optical length for said second reciprocal material;
   expanding said first equation about a design temperature and a design wavelength to generate a Taylor series;
   selecting resulting terms in said Taylor series up to at least a second order to provide first order terms and second order terms representing said total reciprocal rotation of said composite reciprocal rotator as a function of said T and said Λ,
   generating a second equation that relates a transmitted power by said non-reciprocal optical device to said first order terms and said second order terms representing said total reciprocal rotation of said composite reciprocal rotator as a function of said T and said Λ, and
   equating powers of said T and said Λ up to and including said second order terms in said Taylor second and said second equation to determine said first optical path length and said second optical path length.

15. The method of claim 13, wherein a value of said composite reciprocal rotation provided at said design temperature is substantially equal to 2 nπ degrees, where n=0 or any positive or negative integer.

16. The method of claim 13, wherein said composite reciprocal rotator further comprises a third reciprocal material different from both said first and said second reciprocal material, said third reciprocal material selected to render said rejection of backscattered light by said optical device substantially insensitive to changes in wavelength around a design wavelength.

* * * * *